(12) United States Patent
Devarajan et al.

(10) Patent No.: US 8,504,993 B2
(45) Date of Patent: Aug. 6, 2013

(54) VIRTUALIZATION OF MICRO-CODE PATCHES FOR PROBE LESS DEBUG

(75) Inventors: Ramesh Devarajan, Bangalore (IN); Suresh Duthiraru, Tumwater, WA (US); Jaemon Franko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1831 days.

(21) Appl. No.: 11/647,843

(22) Filed: Dec. 29, 2006

(65) Prior Publication Data

US 2008/0163186 A1 Jul. 3, 2008

(51) Int. Cl.
*G06F 9/44* (2006.01)

(52) U.S. Cl.
USPC .............................. 717/128; 717/124; 717/130

(58) Field of Classification Search
None
See application file for complete search history.

(56) References Cited

U.S. PATENT DOCUMENTS

| | | | | |
|---|---|---|---|---|
| 5,796,974 A * | 8/1998 | Goddard et al. | | 712/211 |
| 6,260,157 B1 * | 7/2001 | Schurecht et al. | | 714/6.13 |
| 6,891,765 B2 * | 5/2005 | Saado | | 365/200 |
| 7,117,507 B2 * | 10/2006 | Hostetter et al. | | 717/130 |
| 7,296,101 B2 * | 11/2007 | Lee et al. | | 710/55 |
| 7,404,106 B2 * | 7/2008 | Swoboda | | 717/124 |
| 7,404,178 B2 * | 7/2008 | Cepulis | | 717/124 |
| 7,739,668 B2 * | 6/2010 | Cruickshank et al. | | 717/128 |
| 8,266,597 B2 * | 9/2012 | Panchamukhi et al. | | 717/130 |
| 8,312,435 B2 * | 11/2012 | Wygodny et al. | | 717/130 |
| 8,341,604 B2 * | 12/2012 | Codrescu et al. | | 717/124 |
| 2004/0210720 A1 * | 10/2004 | Wong et al. | | 711/132 |
| 2005/0182869 A1 * | 8/2005 | Lee et al. | | 710/55 |
| 2005/0183069 A1 * | 8/2005 | Cepulis | | 717/128 |
| 2008/0028370 A1 * | 1/2008 | Lewallen et al. | | 717/128 |
| 2008/0115115 A1 * | 5/2008 | Codrescu et al. | | 717/128 |
| 2008/0155172 A1 * | 6/2008 | Li | | 711/102 |
| 2009/0031090 A1 * | 1/2009 | Henry et al. | | 711/154 |
| 2009/0031103 A1 * | 1/2009 | Henry et al. | | 712/16 |
| 2009/0031108 A1 * | 1/2009 | Henry et al. | | 712/32 |
| 2009/0031109 A1 * | 1/2009 | Henry et al. | | 712/37 |
| 2009/0031110 A1 * | 1/2009 | Henry et al. | | 712/37 |
| 2009/0037886 A1 * | 2/2009 | Mccoy et al. | | 717/128 |
| 2009/0271593 A1 * | 10/2009 | Hsu et al. | | 712/226 |
| 2010/0115202 A1 * | 5/2010 | Zimmer et al. | | 711/118 |
| 2010/0180104 A1 * | 7/2010 | Henry et al. | | 712/208 |

OTHER PUBLICATIONS

Narayanasamy et al., "Patching Processor Design Errors", 2006 IEEE, pp. 1-8; <http://ieeexplore.ieee.org/stamp/stamp.jsp?tp=&arnumber=4380861>.*
Sarangi et al., "Patching Processor Design Errors with Programmable Hardware", 2007 IEEE, pp. 12-25; <http://ieeexplore.ieee.org/stamp/stamp.jsp?tp=&arnumber=4205120>.*
Corliss et al., "DISE: A Programmable Macro Engine for Customizing Applications", Jun. 2003 ACM, pp. 1-12; <http://dl.acm.org/citation.cfm?doid=871656.859660>.*
Wagner et al., "CASPAR: Hardware Patching for Multi-core Processors", 2009 EDAA, pp. 1-6; <http://web.eecs.umich.edu/~valeria/research/publications/DATE09Caspar.pdf >.*

* cited by examiner

*Primary Examiner* — Thuy Dao
*Assistant Examiner* — Ben C Wang
(74) *Attorney, Agent, or Firm* — International IP Law Group, P.L.L.C.

(57) ABSTRACT

In some embodiments a method includes storing a micro-code patch stub in a micro-code patch memory, storing a micro-code patch corresponding to the micro-code patch stub in a system memory, in response to an event and in response to the stored micro-code patch stub, loading the stored micro-code patch from the system memory to the micro-code patch memory, and processing the micro-code patch from the micro-code patch memory. Other embodiments are described and claimed.

21 Claims, 3 Drawing Sheets

VIRTUALIZATION OF MICRO-CODE PATCHES FOR PROBE LESS DEBUG

TECHNICAL FIELD

The inventions generally relate to virtualization of micro-code patches for probe less debug.

BACKGROUND

In order to facilitate the testing of silicon devices such as processors while using Debug, Validation, and Coverage Analysis (for example, Probe less Debug Methodology, otherwise known as PDM), the inventors have contemplated using micro-code patches to capture information and send it to a post-silicon debug tool such as an In Target Probe (ITP). However, several patched events are desirable to be captured for Debug, Validation, and Coverage Analysis, and for devices with limited micro-code patch memory space it is not possible to fit all of the patch flows into the patch memory. Additionally, limited patch space continues to increase as an issue as patches are becoming more and more complex and as the number of events to be captured continues to increase.

Methodologies which enable traces to be taken and merged across multiple, repeatable execution passes do not provide sufficient coverage for all Debug and Validation needs. In many environments macro-level execution repeatability cannot be guaranteed. There is also a need to load patches very quickly, so that execution performance does not become unreasonably slow.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
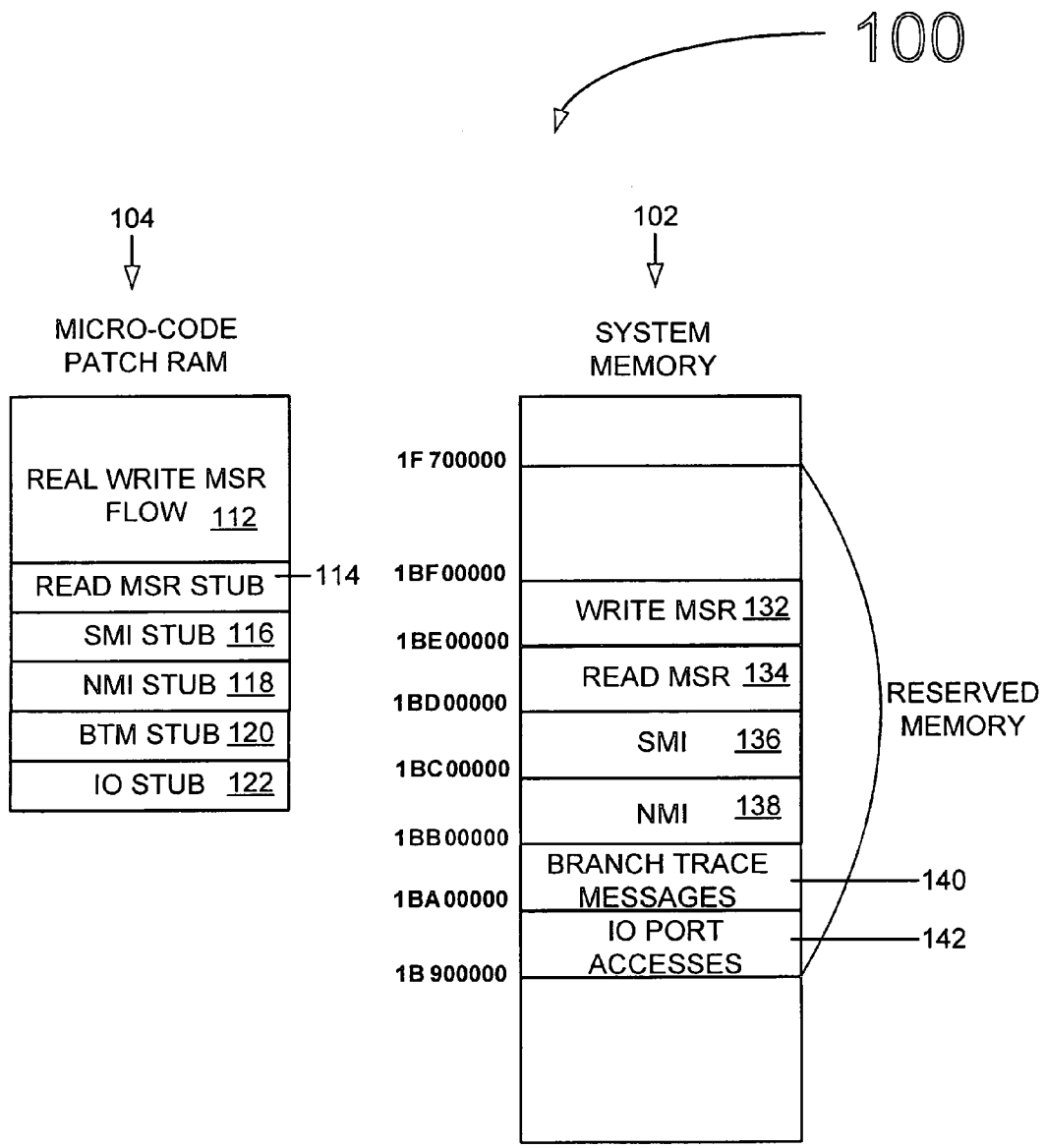
FIG. 1 illustrates an apparatus according to some embodiments of the inventions.

Some embodiments of the inventions relate to virtualization of micro-code patches for probe less debug.

In some embodiments a method includes storing a micro-code patch stub in a micro-code patch memory, storing a micro-code patch corresponding to the micro-code patch stub in a system memory, in response to an event and in response to the stored micro-code patch stub, loading the stored micro-code patch from the system memory to the micro-code patch memory, and processing the micro-code patch from the micro-code patch memory.

In some embodiments, an article includes a computer readable medium having instructions thereon which when executed cause a computer to store a micro-code patch stub in a micro-code patch memory, to store a micro-code patch corresponding to the micro-code patch stub in a system memory, in response to an event and in response to the stored micro-code patch stub, to load the stored micro-code patch from the system memory to the micro-code patch memory, and to process the micro-code patch from the micro-code patch memory.

In some embodiments, a processor includes micro-code patch memory to store a micro-code patch stub, and a patch loader to load a micro-code patch corresponding to the micro-code patch stub from a system memory to the micro-code patch memory in response to an event and in response to the stored micro-code patch stub, wherein the micro-code patch is processed from micro-code patch memory.

In some embodiments, virtualization of micro-code patches is implemented for Debug, Validation, and Coverage Analysis such as, for example, Probe less Debug Methodology (PDM). PDM micro-code tools are developed as a subset of a suite of tools in a PDM tool chain, and are developed to capture various events of interest. Event data along with other architecture state information are captured in a post-silicon environment (for example, without the use of a logic analyzer) and this data can be used to reproduce the same errors found in a pre-silicon environment where there is more visibility. In some embodiments, behaviors of the patch need not be limited to trace information, but can include any required behavior (for example, for any Debug, Validation, and Coverage Analysis). In some embodiments, gathered trace information or debug behaviors enabled using the patches could complement use of a logic analyzer (for example, complement logic analyzer trace information).

Examples of event information that are captured using micro-code patches include branch trace messages (BTMs), IO (Input/Output) port accesses, interrupts, and/or events, etc. Captured information is sent to a post-silicon debug tool such as an In Target Probe (ITP). Examples of a typical number of micro-ops required for each of a number of different types of patched events are shown below. These patched events include branch trace messages (BTMs), IO Port Accesses, Read & Write model-specific registers (MSRs), and/or various types of interrupts such as non-maskable interrupt (NMI), system management interrupt (SMI), other software (SW) interrupts, etc.

| Patched Event | Micro-ops consumed |
| --- | --- |
| Branch Trace Messages | 95 |
| IO Port Accesses | 40 |
| Read & Write MSRs | 45 |
| Interrupts - NMI, SMI, SW | 162 |

In some embodiments, in order to perform Debug, Validation, and Coverage Analysis such as Probe less Debug Methodology (PDM) all of the above listed events need to be captured. Many processors have limited micro-code patch memory space (for example, limited micro-code patch Random Access Memory space or unified Random Access Memory (URAM) space), and it is not possible to fit all of the patch flows in to the URAM space. Therefore, in some embodiments, virtualization of micro-code patches is performed so that the required patch behavior may be dynamically loaded when needed from the system memory to the URAM. In some embodiments, the virtualization uses an underlying patch loader hook developed for some Intel® processors (for example, P6 family of Intel® processors) to load and unload patches from system memory.

In some embodiments, stub patches are developed. Stub patches are dummy patches with no processing functionality for an event. When the event of interest occurs, the appropriate stub patches are invoked. Each stub patch contains the information of the location in system memory where the real patch resides. In some embodiments, a stub patch saves the current state of the registers and dynamically loads the real patch from system memory. In some embodiments, a reserved memory portion within system memory (for example, a Basic Input Output System memory or BIOS reserved memory) is used in order to ensure a safe storage location for the patches.

In some embodiments, the patches (for example, the patches mentioned above) are re-organized to enable virtualization. Each patch loaded into the URAM contains a real patch and the stubs for all the other event patches. For example, each stub patch occupies 8 micro-ops, and a common routine occupying 12 micro-ops is developed which is used to transfer control to the patch loader after supplying the address in system memory holding the real patch. The common routine is used by all the other stubs. Although virtualization adds the overhead of swapping patches from system memory to URAM, it is not constrained by the patch RAM space. In some embodiments, decisions are therefore made as to which events need to be virtualized and which events should not be virtualized.

FIG. 1 illustrates an apparatus 100 according to some embodiments. In some embodiments apparatus 100 includes a system memory 102 (for example, RAM) and a micro-code patch memory 104 (for example, RAM). FIG. 1 illustrates the organization of patches in the system memory 102 and in the micro-code patch memory 104. In the arrangement illustrated in FIG. 1, patch memory 104 includes a real patch 112 for write MSR and stub patches for all the other patches, including read MSR stub 114, SMI stub 116, NMI stub 118, BTM stub 120, and IO stub 122. The actual patches are loaded in an area of the system memory 102 that is specifically reserved for the patches (for example, in a BIOS reserved memory for PDM). Specifically, the reserved memory area of system memory 102 includes the write MSR patch 132, a read MSR patch 134, an SMI patch 136, an NMI patch 138, a BTM patch 140, and an IO port accesses patch 142. As a patch is loaded in the patch memory 104 from the system memory 102, that patch includes a real patch as well as the patch stubs for each of the other event patches. In some embodiments, an underlying patch loader hook developed for the processor is used to load and unload patches from system memory. In this manner, each of the necessary patches may be cycled through the patch memory 104 as necessary, without requiring any manual loading to the system under test. The process is transparent to post-silicon debug tools (for example, ITP).

Figure 2:
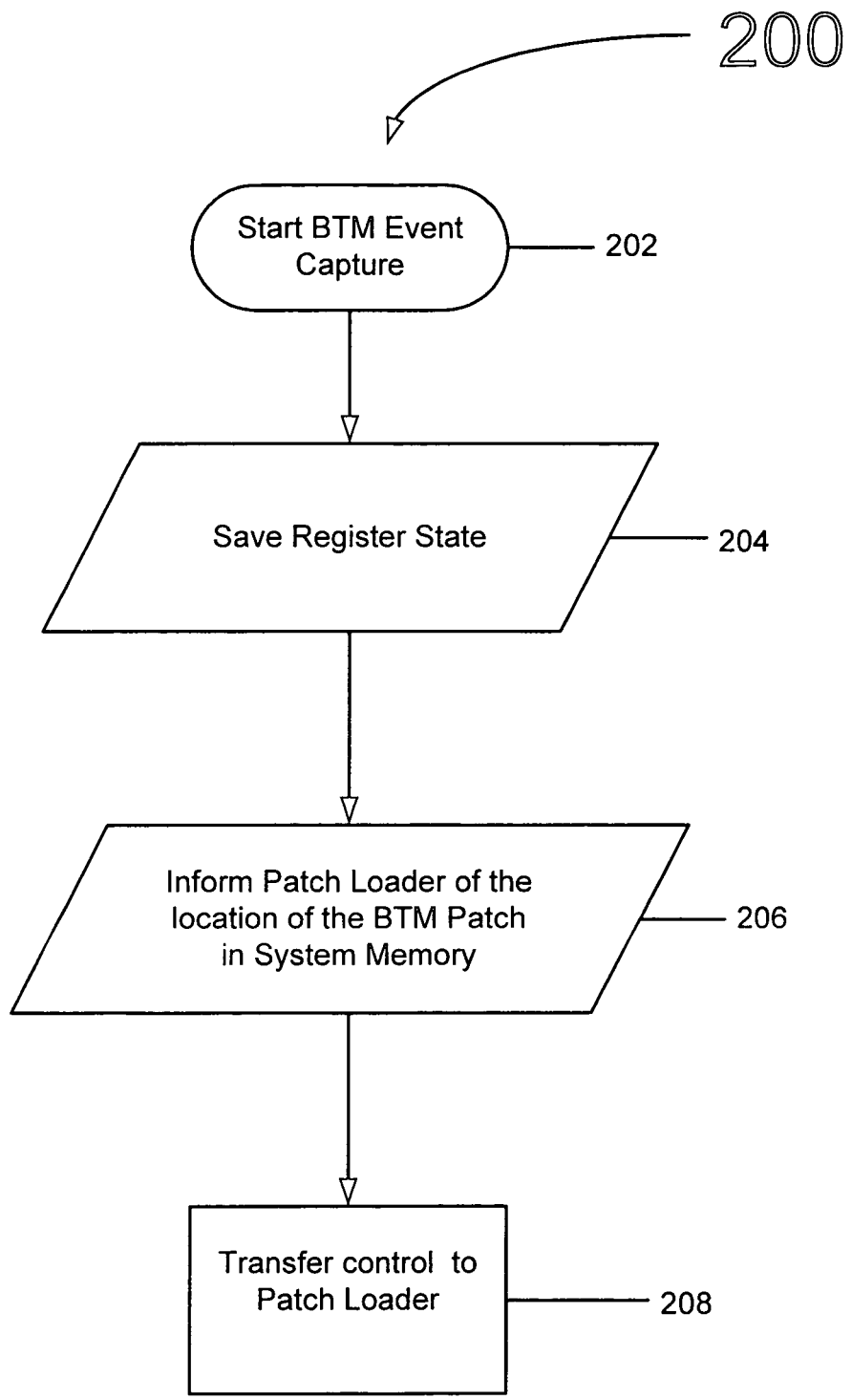
FIG. 2 illustrates a flow according to some embodiments of the inventions.

FIG. 2 illustrates a flow 200 according to some embodiments. FIG. 2 illustrates a stub patch invocation operation (for example, of a BTM event capture). Although FIG. 2 discusses a BTM event capture, the flow of FIG. 2 may be used in some embodiments for any type of event capture (for example, IO Port accesses, Read MSRs, Write MSRs, NMI, SMI, SW interrupts, etc.) In some embodiments, for example, the currently loaded patch in the patch memory contains a different event patch (for example, the Write MSR patch is in the patch memory along with stub patches for the other events when a BTM event happens). When an event happens (for example, a BTM event), the associated stub patch is invoked and the event capture is started at 202. Then the current register state is saved at 204 (for example, the previous write MSR state). The patch loader is informed at 206 of the location in system memory of the patch associated with the new event (for example, the BTM patch). Control is then transferred to the patch loader at 208, and the patch loader takes care of transferring the patch from system memory to the patch memory.

Figure 3:
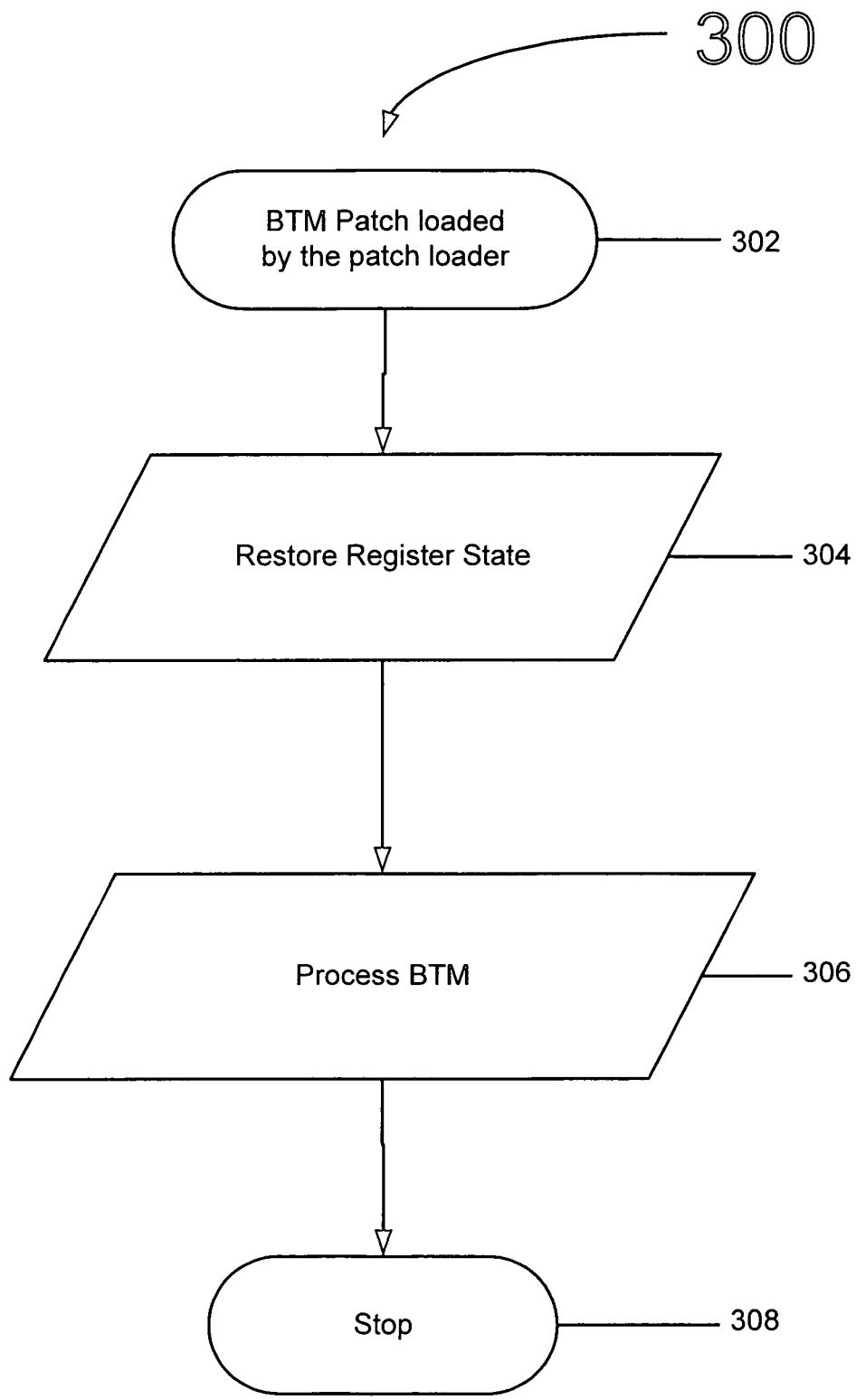
FIG. 3 illustrates a flow according to some embodiments of the inventions.

FIG. 3 illustrates a flow 300 according to some embodiments. FIG. 3 illustrates a patch reload operation using virtualization according to some embodiments. Upon reload, the new patch (for example, the BTM patch) is loaded by the patch loader at 302. The register state is restored at 304 to prevent any corruption of the state. The event flow processing is then performed from the patch memory at 306 (for example, the BTM processing), and the process stops at 308.

Although FIG. 2 and FIG. 3 have been described as responsive to a BTM event capture, including loading a BTM event in the patch memory and processing a BTM event, the flows 200 and 300 of FIG. 2 and FIG. 3 can be applied to any patched events (for example, BTM, IO port accesses, read MSRs, write MSRs, NMI, SMI, SW interrupts, etc.)

In some embodiments, virtualization of micro-code patches is used for probe less debug methodology to overcome the limitations of some processors having limited patch memory space. The patch memory of the system under test is loaded with a stub patch, and the real patches are loaded in the system memory. As the system runs, patches are swapped between the system memory and the patch memory. A post-silicon debug tool such as ITP connected to the system is unaware that patches are being swapped between the system memory and the patch memory. The process is transparent to the post-silicon debug tool. Virtualization is used to capture all the events at the same time and no re-run of the target system is required.

In some embodiments a limitless number of reload and unload operations can be performed between system memory and micro-code patch memory without halting the system under test.

In some embodiments, virtualization does not require additional hardware and/or software, since debug hooks of the processor and reserved system memory (BIOS reserved memory) are used.

In some embodiments, virtualization of micro-code patches is implemented using stubs and by dynamically reloading patches upon occurrence of an event of interest. Stubs occupy a minimal footprint in the patch memory, and perform the task of transferring to the real patch without corrupting the state. In some embodiments, the patch loader hook is used to reload patches based on events, and by organizing stubs in patch memory and the real patches in system memory.

In some embodiments, use of a "system memory" has been discussed for storing patches. In some embodiments, "system memory" could include memory such as reserved on-die side cache space, for example. In some embodiments, "system memory" is completely replaced with other memory such as reserved on-die side cache space, and in some embodiments, "system memory" is complemented with other memory such as reserved on-die side cache space.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
    storing a micro-code patch stub in a micro-code patch memory of a processor, the micro-code patch stub corresponding to a type of processor event;
    storing a micro-code patch corresponding to the micro-code patch stub in a system memory;
    in response to the event and in response to the stored micro-code patch stub, loading the stored micro-code patch from the system memory to the micro-code patch memory; and
    processing the micro-code patch from the micro-code patch memory, wherein processing the micro-code patch comprises capturing information about the event.

2. The method of claim 1, wherein the event is at least one of a branch trace message, an input/output (IO) port access, a read model-specific register, a write model-specific register, a non-maskable interrupt, a system management interrupt, or a software interrupt.

3. The method of claim 1, further comprising storing a plurality of micro-code patch stubs in the micro-code patch memory and storing a plurality of micro-code patches in the system memory, and in response to the event, loading a corresponding one of the stored micro-code patches from the system memory to the micro-code patch memory, and processing the corresponding one of the micro-code patches from the micro-code patch memory.

4. The method of claim 1, wherein an underlying patch loader hook of a processor is used to load and unload patches from system memory.

5. The method of claim 1, further comprising in response to the event and in response to the stored micro-code patch stub, unloading a previously stored micro-code patch from the micro-code patch memory.

6. The method of claim 1, further comprising saving a current register state before loading the stored micro-code patch from the system memory to the micro-code patch memory.

7. The method of claim 6, further comprising restoring the current register state after loading the stored micro-code patch from the system memory to the micro-code patch memory and before processing the micro-code patch from the micro code patch memory.

8. The method of claim 1, wherein the micro-code patch is stored in the system memory in a reserved portion of the system memory.

9. An article comprising:
    a non-transitory, computer readable medium having instructions thereon which when executed cause a computer to:
        store a micro-code patch stub in a micro-code patch memory of a processor, the micro-code patch stub corresponding to a type of processor event;
        store a micro-code patch corresponding to the micro-code patch stub in a system memory;
        in response to the event and in response to the stored micro-code patch stub, load the stored micro-code patch from the system memory to the micro-code patch memory; and
        process the micro-code patch from the micro-code patch memory, wherein processing the micro-code patch comprises capturing information about the event.

10. The article of claim 9, wherein the event is at least one of a branch trace message, an input/output (IO) port access, a read model-specific register, a write model-specific register, a non-maskable interrupt, a system management interrupt, or a software interrupt.

11. The article of claim 9, the computer readable, medium having instructions thereon which when executed further cause a computer to store a plurality of micro-code patch stubs in the micro-code patch memory and to store a plurality of micro-code patches in the system memory, and in response to the event, to load a corresponding one of the stored micro-code patches from the system memory to the micro-code patch memory, and to process the corresponding one of the micro-code patches from the micro-code patch memory.

12. The article of claim 9, the computer readable medium having instructions thereon which when executed further cause a computer, in response to the event and in response to the stored micro-code patch stub, to unload a previously stored micro-code patch from the micro-code patch memory.

13. The article of claim 9, the computer readable medium having instructions thereon which when executed further cause a computer to save a current register state before loading the stored micro-code patch from the system memory to the micro-code patch memory.

14. The article of claim 13, the computer readable medium having instructions thereon which when executed further cause a computer to restore the current register state after loading the stored micro-code patch from the system memory to the micro-code patch memory and before processing the micro-code patch from the micro-code patch memory.

15. A processor comprising:
a micro-code patch memory to store a micro-code patch stub, the micro-code patch stub corresponding to a type of processor event; and
a patch loader to load a micro-code patch corresponding to the micro-code patch stub from a system memory to the micro-code patch memory in response to the event and in response to the stored micro-code patch stub, wherein the micro-code patch is processed from micro-code patch memory, said processing of the micro-code patch comprising capturing information about the event.

16. The processor of claim 15, wherein the event is at least one of a branch trace message, an input/output (IO) port access, a read model-specific register, a write model-specific register, a non-maskable interrupt, a system management interrupt, or a software interrupt.

17. The processor of claim 15, the micro-code patch memory to store a plurality of micro-code patch stubs, and in response to the event, the patch loader to load a corresponding one of a plurality of stored micro-code patches from the system memory to the micro-code patch memory, wherein the corresponding one of the micro-code patches is processed from the micro-code patch memory.

18. The processor of claim 15, wherein the patch loader is an underlying patch loader hook of the processor that is used to load and unload patches from system memory.

19. The processor of claim 15, the patch loader to unload a previously stored micro-code patch from the micro-code patch memory in response to the event and in response to the stored micro-code patch stub.

20. The processor of claim 15, the micro-code patch stub to save a current register state before the patch loader loads the stored micro-code patch from the system memory to the micro-code patch memory.

21. The processor of claim 20, the micro-code patch to restore the current register state before processing the event.

* * * * *